United States Patent
Feekes et al.

(10) Patent No.: US 12,195,615 B2
(45) Date of Patent: Jan. 14, 2025

(54) AUTOMOTIVE PART

(71) Applicant: SABIC GLOBAL TECHNOLOGIES B.V., Bergen op Zoom (NL)

(72) Inventors: Mark Feekes, Geleen (NL); Sarah Van Mierloo, Geleen (NL); Koen Batinas-Geurts, Geleen (NL); Dimphna Johanna Maria Van Beek, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 512 days.

(21) Appl. No.: 16/472,567

(22) PCT Filed: Dec. 19, 2017

(86) PCT No.: PCT/EP2017/083590
§ 371 (c)(1),
(2) Date: Jun. 21, 2019

(87) PCT Pub. No.: WO2018/114977
PCT Pub. Date: Jun. 28, 2018

(65) Prior Publication Data
US 2019/0322853 A1    Oct. 24, 2019

(30) Foreign Application Priority Data

Dec. 23, 2016 (EP) ................................ 16206545
Dec. 23, 2016 (EP) ................................ 16206554
Dec. 23, 2016 (EP) ................................ 16206556

(51) Int. Cl.
| | |
|---|---|
| *C08L 23/16* | (2006.01) |
| *B29C 45/00* | (2006.01) |
| *B29K 23/00* | (2006.01) |
| *B29K 105/00* | (2006.01) |
| *B29K 509/00* | (2006.01) |
| *B29L 31/30* | (2006.01) |
| *C08L 23/08* | (2006.01) |

(52) U.S. Cl.
CPC .......... *C08L 23/16* (2013.01); *B29C 45/0001* (2013.01); *B29K 2023/04* (2013.01); *B29K 2023/12* (2013.01); *B29K 2105/0044* (2013.01); *B29K 2105/0094* (2013.01); *B29K 2509/00* (2013.01); *B29L 2031/3044* (2013.01); *C08L 23/0815* (2013.01); *C08L 2201/08* (2013.01); *C08L 2205/025* (2013.01); *C08L 2207/02* (2013.01)

(58) Field of Classification Search
CPC ................. C08L 2207/02; C08L 23/0815
See application file for complete search history.

(56) References Cited

U.S. PATENT DOCUMENTS

| | | | |
|---|---|---|---|
| 6,348,536 B1 | 2/2002 | Fourty et al. | |
| 2003/0060543 A1* | 3/2003 | Seip | C08K 5/3435 |
| | | | 524/87 |
| 2004/0044107 A1 | 3/2004 | Kikuchi et al. | |
| 2016/0024287 A1* | 1/2016 | Rohrmann | C08J 5/00 |
| | | | 524/451 |
| 2016/0326355 A1* | 11/2016 | Marques Ferreira Custodio | ........ |
| | | | C08L 23/12 |

FOREIGN PATENT DOCUMENTS

| | | | |
|---|---|---|---|
| CN | 10558775 A | 5/2016 | |
| EP | 0716121 A1 | 6/1996 | |
| EP | 1038912 A2 | 9/2000 | |
| EP | 2386602 A1 | 11/2011 | |
| EP | 2781548 A1 | 9/2014 | |
| WO | WO-2009007265 A1 * | 1/2009 | ............. C08J 3/226 |
| WO | 2015078886 A1 | 6/2015 | |
| WO | 2015091151 A1 | 6/2015 | |
| WO | 2015091810 A1 | 6/2015 | |
| WO | 2015173315 A1 | 11/2015 | |

(Continued)

OTHER PUBLICATIONS

International Search Report; International Application No. PCT/EP2017/083590; International Filing Date: Dec. 19, 2017; Date of Mailing: Mar. 16, 2018; 4 pages.

(Continued)

*Primary Examiner* — Wenwen Cai
(74) *Attorney, Agent, or Firm* — CANTOR COLBURN LLP

(57) ABSTRACT

The present invention relates to an automotive part (such as an exterior automotive part, a semi-exterior automotive part or an interior automotive part) prepared from a thermoplastic composition comprising:

- from 48-95 wt. % based on the weight of the composition of a heterophasic propylene copolymer; wherein said heterophasic propylene copolymer consists of i) a propylene-based matrix consisting of a propylene homopolymer and/or a propylene-α-olefin copolymer, said propylene α-olefin copolymer consisting of at least 70 wt. %, and ii) a dispersed ethylene-α-olefin copolymer comprising ethylene and at least one C3 to C10 α-olefin;
- from 0-20 wt. %, preferably from 1-20 wt. % ethylene-α-olefin elastomer comprising ethylene and a C3 to C10 α-olefin;
- from 1-30 wt. % high aspect ratio;
- from 0.05-2 wt. % antioxidant additive selected from the group consisting of i) a tocopherol or a tocotrienol; or ii) a hydroxylamine
- from 0-3 wt. % an additional additive.

19 Claims, No Drawings

(56) References Cited

FOREIGN PATENT DOCUMENTS

WO 2018114979 A1 6/2018
WO 2018114984 A1 6/2018

OTHER PUBLICATIONS

Soares et al. "Polyolefin Reactors and Processes" Polyolefin Reaction Engineering, First Edition, Chapter 4, 2012, pp. 1-43.
VDA 277 "Analysis of Volatile Contaminants from Polymers", 1995, 3 pages.
VDA 278 "Thermal Desorption Analysis of Organic Emissions for the Characterization of Non-Metallic Materials for Automobiles", Oct. 2011, pp. 1-19.
Written Opinion; International Application No. PCT/EP2017/083590; International Filing Date: Dec. 19, 2017; Date of Mailing: Mar. 16, 2018; 6 pages.

* cited by examiner

AUTOMOTIVE PART

CROSS REFERENCE TO RELATED APPLICATIONS

This application is a 371 of International Application No. PCT/EP2017/083590, filed Dec. 19, 2017, which is incorporated by reference in its entirety, and which claims priority to European Application Serial No. 16206545.2 filed Dec. 23, 2016, European Application Serial No. 16206554.4 filed Dec. 23, 2016, and European Application Serial No. 16206556.9 filed Dec. 23, 2016.

The present invention relates to an automotive part, prepared from a thermoplastic composition, and to the use of a thermoplastic composition for the manufacture of an automotive part and to a thermoplastic composition. In an embodiment, said automotive part is an exterior automotive part, preferably a bumper fascia. In an embodiment, said automotive part is a semi-exterior automotive part, preferably a cowl top. In an embodiment, said automotive part is an interior automotive part, preferably a door panel, instrument panel or pillar trim.

In the automotive industry polypropylene based materials are often used for their desirable combination of good mechanical properties and low cost. In particular so called impact propylene copolymers are often used in applications like bumper fascia, cowl tops, instrument panels, pillar trims, and door panels. The requirements for automotive applications include low Coefficient of Linear Thermal Expansion (CLTE), good impact strength, good stiffness, scratch resistance (in particular for interior automotive parts) and good optical surface properties. In order to obtain a low CLTE together with the desired mechanical properties the polypropylene based materials usually contain a certain amount of inorganic filler, such as in particular talc.

The addition of talc, however, is known to deteriorate the optical surface properties. In particular it increases the risk for so called "tiger stripes (TS)". Tiger stripes as used herein refers to color and gloss variations on the surface of an injection molded article, which occurs because of unstable mold filling properties of the molten polymer as it is being injected into the mold and formed into the desired shape. Usually these variations can be observed as alternating areas of low and high gloss and/or light or darker color, wherein the areas usually are substantially perpendicular to the flow direction of an injection molded article. Tiger stripes may also be referred to as tiger marks or tiger (flow) markings. Tiger stripes typically occur in polypropylene based materials containing polypropylene, a rubber dispersed in the polypropylene and an inorganic filler, in particular talc. Tiger stripes are undesirable in automotive applications, in particular in case where the polypropylene based material is not provided with an additional layer such as paint or a laminating layer.

Emissions from interior thermoplastic automotive parts has been an issue receiving serious considering for interior parts since said emissions could adversely affect vehicle interior air quality, and thus lead to a concern regarding the health of drivers and passengers. However exterior thermoplastic automotive parts, such as the automotive bumper, or semi-exterior thermoplastic automotive parts, being parts on the boundary of interior and exterior, such as cowl tops, may also lead to emissions.

In the automotive industry, there is a trend towards high performance products with reduced weight. Fillers are required to achieve the required strength of the automotive parts. Short glass fibers (SGF) are often used as fillers. Talc is also often used as fillers, especially high aspect ratio (HAR) talc (explained in detail below). A disadvantage of the current compositions is that they have a certain emission of volatile organic compounds (VOCs) that is above desired levels.

Accordingly, it is an object of the invention to provide a material for typical use in an automotive part having high impact resistance and low emission. It is a further object of the present invention to provide a thermoplastic material having a desired combination of mechanical properties that is inter alia suitable for the manufacture of automotive parts. The present inventors surprisingly found that one or more of these objects can be met by a specifically defined reinforced composition.

Accordingly, the present invention is directed at an automotive part prepared from a composition as disclosed herein. The composition combines a reduced emission with high stiffness and therefore is very suitable as a material for preparing an automotive part. The present invention is related to both unpainted automotive parts and automotive parts that may be painted.

Definitions

"automotive part" as used in the present description means an exterior automotive part, a semi-exterior automotive part or an interior automotive part.

"exterior automotive part" as used in the present description means an automotive part that is present on the exterior part of a vehicle, for example a bumper.

"bumper" as used in the present description means a structure that is attached to or integrated in the front and rear of a vehicle intended to absorb impact in a (minor) collision; the structure usually consists of a cover of fascia—to which the present invention is related—over a reinforcement bar, e.g. made of metal or composite. When in the present invention bumper is cited, bumper fascia is meant.

"semi-exterior automotive part" as used in the present description means an automotive part that is present on, or connects to, both the exterior and the interior part of a vehicle, for example a cowl top.

"cowl top" as used in the present description means the front part of the vehicle's frame that supports the rear of the hood, windshield, dashboard, pedals and instrument panel. The cowl or cowl top separates the passenger compartment from the engine.

"interior automotive part" as used in the present description means an automotive part that is present in the interior of a vehicle, for example an instrument panel or pillar trim or a door panel.

"instrument panel" as used in the present description means the dashboard of a vehicle, being a control panel located directly in front of a vehicle's driver, displaying instrumentation and controls for the vehicle's operation.

"pillar trim" as used in the present description means the (decorative) molding of the pillars of a vehicle, which are the vertical or near vertical supports of a vehicle's window area.

"door panel" as used in the present description means (decorative) panels on the inside surface of a door of a vehicle.

"vehicle" as used in the present description means any motorized means of transport having at least 4 wheels, including cars, vans, busses, trucks etc.

"VOC" as used in the present description means: Volatile Organic Compounds having a boiling point of ≥50° C. and <260° C. and also including Very Volatile Organic Compounds (VVOC) having a boiling point of <50° C. This is measured in units of microgram per gram sample according to VDA 278 "*Thermal Desorption Analysis of Organic Emissions for the Characterization of Non-Metallic Materials for Automobiles*", October 2011, 180° C., 30 min on the granulated compounds or on injection molded plaques. Injection molded plaques are stored in airtight bags at a maximum temperature of 23° C.

"SVOC" as used in the present description means: Semi Volatile Organic Compounds having a boiling point of ≥260° C. and <400° C. This is measured in units of microgram per gram sample according to VDA 278 "*Thermal Desorption Analysis of Organic Emissions for the Characterization of Non-Metallic Materials for Automobiles*", October 2011, 180° C., 30 min on the granulated compounds or on injection molded plaques. Injection molded plaques are stored in airtight bags at a maximum temperature of 23° C.

"FOG" as used in the present description means: the sum of VOC and SVOC. This is measured in units of microgram per gram sample according to VDA 278 "*Thermal Desorption Analysis of Organic Emissions for the Characterization of Non-Metallic Materials for Automobiles*", October 2011, first heating 90° C., 30 min, second heating 120° C., 1 hour on the granulated compounds or on injection molded plaques. Injection molded plaques are stored in airtight bags at a maximum temperature of 23° C. "TVOC" as used in the present description means the Total VOC. This is measured in units of microgram of carbon per gram sample according to VDA 277 "the analysis of volatile contaminants from polymers", 1995 on the granulated compounds or on injection molded plaques. Injection molded plaques are stored in airtight bags at a maximum temperature of 23° C.

"thermoplastic composition" as used in the present description means a composition comprising at least one thermoplastic polymer.

"polymer" as used in the present description includes homopolymers and all types of copolymers.

"heterophasic propylene copolymer" as used in the present description means a copolymer having at least a two-phase structure, consisting of a propylene-based (semicrystalline) matrix and a dispersed ethylene-α-olefin copolymer forming the rubber phase. These heterophasic polypropylenes are generally prepared in a series of reactors, by polymerization of propylene in the presence of a catalyst system, and subsequent polymerization of a propylene-α-olefin mixture. However they may also be made by blending different (co)polymers. Heterophasic propylene copolymers are sometimes referred to as impact copolymers since one of the advantages of heterophasic polypropylene is improved impact resistance, especially at lower temperatures.

"propylene-based matrix" as used in the present description means a composition consisting of one or more polypropylenes. For the avoidance of doubt it should be understood that the propylene-based matrix essentially consists of said one or more polypropylenes and does not contain any other materials in an amount more than 2 wt. %. Or, said in another way, the propylene-based matrix consists of at least 98 wt. %, preferably at least 99 wt. % of one or more polypropylenes. It may be propylene homopolymers or propylene copolymers.

"ethylene α-olefin copolymer" as used in the present description means a copolymer that is prepared from ethylene and at least one other α-olefin monomer having from 3 to 10 carbon atoms (C3-C10 α-olefin monomer) that forms the dispersed phase within the propylene-based matrix phase. The ethylene α-olefin copolymer forms the rubber content (RC) of the heterophasic propylene copolymer composition.

"ethylene α-olefin elastomer" as used in the present description means an additional elastomer that might be present in the composition. Such ethylene α-olefin elastomers are sometimes also referred to as plastomers. It is not the same as the ethylene α-olefin copolymer present in the heterophasic propylene copolymer. The elastomer is prepared from ethylene and at least one other C3-C10 α-olefin monomer.

"high aspect ratio (HAR) talc" as used in the present description means a talc having a high aspect ratio, such as talc having a lamellarity of at least 2.8.

"aspect ratio" as used in the present description means a ratio of the smallest diameter of a talc particle over the largest diameter of a talc particle orthogonal to the smallest diameter. The aspect ratio approaches zero for a very elongated particle (that is the particle has a high aspect ratio) and is 1 for a perfectly round particle.

"phenolic antioxidant additive" as used in the present description means an antioxidant additive that comprises one or more phenolic groups, preferably phenolic groups having one or more substituents on the aromatic ring, preferably said substituents are substituted alkyls, such as iso-propyl or tert-butyl groups.

"free of phenolic antioxidant additive" as used in the present description means that there is less than 0.05 wt. %, preferably less than 0.02 wt. %, more preferably less than 0.01 wt. %, such as 0.0 wt. % based on the weight of the composition.

"bis-alkyl-N-hydroxyl amine" as used in the present description means an amine having two alkyl tails and a hydroxyl group attached to the amine nitrogen. "additional additives" as used in the present description means other additives besides the antioxidant additive.

"tiger stripes" as used in the present invention means a visual defect on the surface of the objects, whereby a(n) (alternating) pattern of light and dark stripes can be observed. Tiger stripes are measured using the method described herein.

SUMMARY OF THE INVENTION

The present invention relates in a first aspect to an automotive part prepared from a thermoplastic composition as disclosed herein.

In an embodiment the heterophasic propylene copolymer consists of
  i) a propylene-based matrix consisting of a propylene homopolymer and/or a propylene-α-olefin copolymer, said propylene α-olefin copolymer consisting of at least 70 wt. %, preferably at least 90 wt. % of propylene and at most 30 wt. %, preferably at most 10 wt. % of α-olefin, based on the total weight of the propylene α-olefin copolymer, wherein the propylene-based matrix is present in an amount of 60 to 95 wt. % based on the total weight of the heterophasic propylene copolymer, and
  ii) a dispersed ethylene-α-olefin copolymer comprising ethylene and at least one C3-C10 α-olefin; wherein the dispersed ethylene-α-olefin copolymer is present in an amount of 40 to 5 wt. % based on the total weight of the heterophasic propylene copolymer, and wherein the sum of the total amount of propylene-based matrix and the total amount of dispersed ethylene-α-olefin copolymer in the heterophasic propylene copolymer is 100 wt. %.

In an embodiment, the amount of ethylene in the ethylene-α-olefin copolymer is in the range of 20-65 wt. % based on the weight of the ethylene-α-olefin copolymer. The amount of ethylene in the ethylene-α-olefin copolymer may be determined using $^{13}C$ NMR as is known to the person skilled in the art. The α-olefin in the ethylene-α-olefin copolymer is chosen from the group of ethylene and C3-C10 α-olefins. Preferably, the α-olefin is chosen from the group of α-olefins having 3 to 8 carbon atoms and any mixtures thereof, preferably the α-olefin in the ethylene-α-olefin copolymer is propylene.

According to the present invention a specific antioxidant is used, being either a tocopherol and/or tocotrienol or a hydroxyl amine. The present inventors have observed than when these are combined with HAR talc they provide excellent properties of the material combined with low emission.

In a first embodiment the composition comprises a heterophasic propylene copolymer, said heterophasic propylene copolymer (HPC-D) comprising: i) from 70 to 92 wt. % based on the weight of said heterophasic propylene copolymer of a propylene-based matrix consisting of a polypropylene having a melt flow index of at least 150 g/10 min; and wherein the propylene polymer has an intrinsic viscosity $IV_{PP}$; ii) from 8 to 30 wt. % based on the weight of said heterophasic propylene copolymer of a dispersed ethylene-α-olefin copolymer having an ethylene content of between 10 and 55 wt. % based on the weight of the ethylene-α-olefin copolymer and wherein the ethylene-α-olefin copolymer has an intrinsic viscosity $IV_{EPR}$; and wherein the ratio of $IV_{EPR}/IV_{PP}$ is between 3 and 7, preferably between 3 and 5. More information and embodiments related to this first embodiment can be found in WO2015/091810 on page 3 line 10 to page 7, line 3; which section is incorporated by reference.

In a second embodiment, the composition comprises a heterophasic propylene copolymer (HPC-A) comprising: 1) from 70 to 90 wt. % based on the weight of the heterophasic propylene copolymer of a polypropylene-based matrix consisting of a polypropylene having a melt flow index of from 55 to 85 g/10 min; and 2) from 10 to 45 wt. % based on the weight of the heterophasic propylene copolymer of a dispersed-ethylene-α-olefin copolymer having a melt flow index of from 2.5 to 5.0 g/10 min. More specific embodiments of this second embodiment can be found in WO2015/091151 on page 7, line 11 to page 8, line 34; which section is incorporated by reference.

In a third embodiment, the composition comprises a heterophasic propylene copolymer (HPC-B) comprising: a) from 60 to 85 wt. % based on the weight of the heterophasic propylene copolymer of a polypropylene-based matrix consisting of a polypropylene having a melt flow index of from 50 to 250 g/10 min, preferably from 50 to 100 g/10 min; and b) from 15 to 40 wt. % based on the weight of the heterophasic propylene copolymer of a dispersed ethylene-α-olefin copolymer having a melt flow index of from 0.050 to 0.30 g/10 min. More specific embodiments of this third embodiment can be found in WO2015/091151 on page 9, line 1 to page 10, line 20; which section is incorporated by reference.

In a fourth embodiment, the composition comprises a first and a second heterophasic propylene copolymer (HPC-A&B) in a weight ratio of between 1:1 and 10:1 of A) said first heterophasic propylene copolymer comprising: A1) from 70 to 90 wt. % based on the weight of the first heterophasic propylene copolymer of a first polypropylene-based matrix consisting of a polypropylene having a melt flow index of from 55 to 85 g/10 min; and A2) from 10 to 45 wt. % based on the weight of the first heterophasic propylene copolymer of a first dispersed-ethylene-α-olefin copolymer having a melt flow index of from 2.5 to 5.0 g/10 min; B) said second heterophasic propylene copolymer comprising:
B1) from 60 to 85 wt. % based on the weight of the second heterophasic propylene copolymer of a second polypropylene-based matrix consisting of a polypropylene having a melt flow index of from 50 to 250 g/10 min, preferably from 50 to 100 g/10 min; and
B2) from 15 to 40 wt. % based on the weight of the second heterophasic propylene copolymer of a second dispersed ethylene-α-olefin copolymer having a melt flow index of from 0.050 to 0.30 g/10 min. More specific embodiments of this fourth embodiment can be found in WO2015/091151 on page 5, line 32 to page 6, line 20 and page 10 line 22 to page 17, line 6; which section is incorporated by reference.

In a fifth embodiment the composition comprises one heterophasic propylene copolymer (HPC-C), said heterophasic propylene copolymer having a melt flow rate of at least 40 g/10 min and a FOG value of at most 500 μg/g, at most 400 μg/g, preferably at most 350 μg/g. Preferably, wherein said heterophasic propylene copolymer is obtained by visbreaking of an intermediate heterophasic propylene copolymer in a shifting ratio, which complies with the following formula:

$$0.0011x^2 - 0.011x + 1 \leq \text{shifting ratio} \leq -0.0009x^2 + 0.1963x + 1$$

wherein x stands for the melt flow rate of the final heterophasic propylene copolymer obtained after visbreaking of the intermediate heterophasic propylene copolymer, wherein the shifting ratio is the melt flow rate of the final heterophasic propylene copolymer divided by the melt flow rate of the intermediate heterophasic propylene copolymer.

The composition may also comprise a combination of two or more of the heterophasic propylene copolymers according to the first and/or second and/or third and/or fourth and/or fifth embodiments, viz. HPC-D, HPC-A, HPC-B, HPC-A&B, and HPC-C respectively.

In an embodiment, that may be combined with the first aspect of the invention, with the first, second, third, fourth and fifth embodiments the composition has a tensile modulus of at least 1200 MPa, preferably at least 1500 MPa preferably at least 2000 MPa, more preferably at least 2100 MPa. In an embodiment, wherein the amount of HAR talc as a filler is at least 25 wt. % based on the weight of the composition, preferably the composition has a tensile modulus of at least 2200 MPa, preferably at least 2400 MPa, more preferably at least 2600 MPa.

In an embodiment of the present exterior automotive part, that may be combined with the first aspect of the invention, with the first, second, third, fourth and fifth embodiments the composition has an Izod impact strength of at least 1.5 $kJ/m^2$ at −20° C. and/or at least 35 $kJ/m^2$ 23° C. (tough failure).

In an embodiment of the present semi-exterior automotive part, that may be combined with the first aspect of the invention, with the first, second, third, fourth and fifth embodiments the composition has an Izod impact strength of at least 1.5 $kJ/m^2$ at 0° C. and/or at least and/or at least 10 $kJ/m^2$ at 23° C.

In an embodiment of the present interior automotive part, that may be combined with the first aspect of the invention, with the first, second, third, fourth and fifth embodiments the composition has an Izod impact strength of at least 1.5 kJ/m$^2$ at 0° C. and/or at least 10 kJ/m$^2$ at 23° C.

In an embodiment, that may be combined with the first aspect of the invention, with the first, second, third, fourth and fifth embodiments the composition has a flexural modulus of at least 1300 MPa (or N/mm$^2$), preferably at least 1400 MPa, more preferably at least 1500 MPa, even more preferably at least 1800 MPa, further preferred at least 2000 MPa. In an embodiment, wherein the amount of HAR talc as a filler is at least 20 wt. % based on the weight of the composition, preferably the composition has a flexural modulus of at least 1800 MPa, preferably at least 2000 MPa.

In an embodiment, that may be combined with the first aspect of the invention, with the first, second, third, fourth and fifth embodiments the composition has a warpage of at most 1.4, preferably at most 1.2. In an embodiment, the warpage is at least 0.6, preferably at least 0.8. The warpage depends amongst others on the amount of HAR talc that is used.

In an embodiment, that may be combined with the first aspect of the invention, with the first, second, third, fourth and fifth embodiments the composition has an emission of volatile organic compounds (VOCs) of at most 250 microgram/gram, preferably at most 200 microgram/gram, more preferably at most 150 microgram/gram.

In an embodiment, that may be combined with the first aspect of the invention, with the first, second, third, fourth and fifth embodiments the composition has a Total carbon emission (TVOCs) of at most 50 microgram of carbon/gram, preferably at most 40 microgram of carbon/gram, more preferably 20 microgram of carbon/gram. In an embodiment, wherein the amount of HAR talc as a filler is at least 20 wt. % based on the weight of the composition, preferably the composition has a TVOCs of at most 20 microgram of carbon/gram, preferably at most 15 microgram of carbon/gram. In an embodiment, that may be combined with the first aspect of the invention, the composition has a melt flow index between 5 and 70, preferably 10 to 45 g/10 min.

In an embodiment, that may be combined with the first aspect of the invention, with the first, second, third, fourth and fifth embodiments a light stabilizer is present as additional additive, preferably wherein the automotive part has a tiger stripe value of at least 7. Preferably, in said embodiment HPC-D is used as the composition.

This embodiment of the composition is preferably used for unpainted automotive parts. In an embodiment, said automotive part comprises at least 90 wt. %, preferably at least 95 wt. %, more preferably at least 99 wt. % or even 100 wt. % of the composition according to the invention. In other words, said automotive part may consist of said composition.

The present invention relates in a second aspect to a method for the manufacture of the automotive part comprising preferably thermoforming or injection molding the composition according to the invention as the first aspect or any of the embodiments thereof, such as the first, second, third, fourth, and/or fifth embodiments. The composition may be processed by any conventional processing technique known in the art into a shaped article. Suitable non-limiting examples include injection molding, rotational molding, compression molding, extrusion and extrusion compression molding.

The present invention relates in fourth and third aspects to respectively a composition as disclosed in herein and to its use for the manufacture of a part in automotive applications.

Please note that the embodiments (e.g. the first, second, third, fourth and fifth embodiments) disclosed above and below are also applicable to each of the other aspects (second, third, and fourth).

Without wishing to be bound by a particular theory, the present inventors have observed that when HAR talc is used in combination with some phenolic antioxidant additives the emission values might increase undesirably. An example of such a phenolic antioxidant additive is pentaerythritol tetrakis(3-(3,5-di-tert-butyl-4-hydroxyphenyl)propionate) (also known commercially as Irganox 1010 or Evernox 10 or Anox 20 and present in Irganox B225 or Evernox B110 or Anox BB 011). The present inventors have solved this problem by the use of an different antioxidant additive.

It was surprisingly found by the present inventors that the combination of HAR talc and the additives according to the invention has a large, synergistic reducing effect on the emission.

Thermoplastic Composition

The composition according to the present invention comprises the following components that will each be discussed in detail below: heterophasic propylene copolymer; optionally an ethylene-α-olefin elastomer; high aspect ratio talc; antioxidant additive; and optionally additional additives. More information about the preparation and parameters of the composition are discussed below.

Heterophasic Propylene Copolymer

The composition may comprise one or more heterophasic propylene copolymers. In case the composition comprises two grades of heterophasic propylene copolymer each preferably have distinct and different characteristics, allowing mechanical and melt flow properties to be balanced with good tiger stripe performance. In the embodiment wherein the composition comprises two types of heterophasic propylene composition, for example the melt flow index of the first polypropylene and the second polypropylene may be the same or different. For the purpose of the present invention the combined amount of polypropylene-based matrix and dispersed ethylene-α-olefin copolymer in the heterophasic propylene copolymer is 100 wt. % based on the weight of the heterophasic propylene copolymer. In other words, preferably in addition to the polypropylene and ethylene-α-olefin copolymer no other materials are comprised in the heterophasic propylene copolymer except for an optional small amount of stabilizers and/or additives common in the art.

Polypropylene: Manufacture

The heterophasic propylene copolymers employed in the present invention can be produced using any conventional technique known to the skilled person, for example multi-stage process polymerization, such as bulk polymerization, gas phase polymerization, slurry polymerization, solution polymerization or any combinations thereof.

The person skilled in the art is aware of what type of reactors are suitable for the preparation of heterophasic propylene copolymers. For example, Polyolefin Reaction Engineering by J. B. P. Soares and T. F. L. McKenna, July 2012 gives an overview of reactor and processes which are suitable for the production of polypropylene in Chapter 4. For example, the heterophasic propylene copolymer may be prepared in two stages using a first and a second gas-phase reactor, wherein in the first reactor the propylene and optional C3-C10 α-olefin are reacted to form the polypropylene matrix and wherein in the second reactor the polypropylene matrix and the ethylene are reacted with the C3-C10 α-olefin to form the heterophasic propylene copolymer. For example, the gas phase reactors are horizontal stirred gas-phase reactors.

Such polymerization processes are carried out by contacting the monomers with a catalyst, such as a metallocene or a Ziegler Natta type of catalyst. Ziegler Natta catalyst systems are known in the art and comprise a catalyst component, a co-catalyst component and an external donor. The catalyst component of the catalyst system primarily contains magnesium, titanium, halogen and an internal donor. Electron donors control the stereo specific properties and/or improve the activity of the catalyst system. A number of electron donors including ethers, esters, polysilanes, polysiloxanes, and alkoxysilanes are known in the art.

Heterophasic propylene copolymers suitable for use in the invention are known to the person skilled in the art and are commercially available from for example SABIC, Borealis, Total etc.

Propylene-Based Matrix

The heterophasic propylene copolymer comprises a propylene-based matrix consisting of a propylene homopolymer and/or a propylene α-olefin copolymer, said propylene α-olefin copolymer consisting of at least 70 wt. %, preferably at least 90 wt. % of propylene and at most 30 wt. %, preferably at most 10 wt. % of α-olefin, based on the total weight of the propylene α-olefin copolymer, For the avoidance of doubt, the α-olefin, in the propylene α-olefin copolymer is a monomer other than propylene. Suitable α-olefins include ethylene, 1-butene, 1-pentene, 1-hexene, 1-heptene, 1-octene, 1-nonene, 1-decene and 4-methyl-1-pentene; ethylene being preferred in view of its availability and relative ease of manufacture.

Dispersed Ethylene-α-Olefin Copolymer

In addition to the propylene(s) at least one ethylene-α-olefin is present in the heterophasic propylene copolymer as the dispersed rubber phase. The melt flow index of the ethylene-α-olefin copolymer is said to be "in accordance with ISO1133" for the reason that this melt flow index was calculated rather than actually measured. The calculation was carried out as follows:

$$\text{Log}(MFI_{copol}) = X_{matrix} * \text{Log}(MFI_{matrix}) + X_{disperse} * \text{Log}(MFI_{disperse})$$

wherein: $MFI_{copol}$=Melt flow index of the heterophasic propylene copolymer; $MFI_{matrix}$=Melt flow index of the matrix phase, i.e. the polypropylene; $MFI_{disperse}$=Melt flow index of the disperse to be calculated; and $X_{matrix}$ and $X_{disperse}$ represent the weight fractions of the matrix and disperse phase respectively.

Ethylene-Alpha (α)-Olefin Elastomer

The composition according to the present invention may further comprise from 0-20 wt. %, based on the weight of the composition, of an ethylene α-olefin elastomer. Such ethylene α-olefin elastomer is preferably selected from one or more of ethylene-butene elastomer, ethylene-hexene elastomer and ethylene-octene elastomer. Even more preferably, the ethylene α-olefin elastomer is selected from one or more of an metallocene ethylene octene elastomer and a metallocene ethylene butene elastomer. Typically, these elastomers are added to further improve the impact resistance. The density of such elastomers may be from 860-885 kg/m³. The melt flow index for the elastomer may be from 0.10-10 g/10 min. Preferably, the composition according to the present invention comprises from 5-20 wt. %, or 7-18 wt. %, or 10-15 wt. % of elastomer.

Elastomers which are suitable for use in the current invention are commercially available for example under the trademark EXACT™ available from Exxon Chemical Company of Houston, Texas or under the trademark ENGAGE™ polymers, a line of metallocene catalyzed plastomers available from Dow Chemical Company of Midland, Michigan or Nexlene™ from SK Chemicals. Commercially available examples of suitable ethylene α-olefin elastomers are Tafmer DF605, Tafmer DF740, H5030S from Mitsui Chemicals America Inc, Engage 7447, Engage 8200, Engage 8207 from DOW, Exact 9371, Exact 9061 from Exxon, LC565, LC165, LC170 from LG, Fortify C5070D from SABIC.

High Aspect Ratio Talc

High aspect ratio (HAR) talc is known for its use as a filler in compositions. High aspect ratio talc is discussed in U.S. Pat. No. 6,348,536 of Luzenac, which patent is incorporated by reference in this application regarding the disclosure of the talc. Talc is a natural mineral that may be processed in order to arrive at HAR talc. The present composition may comprise from more than 1 at up to 30 wt. %, preferably from more than 5 at up to 30 wt. % of high aspect ratio (HAR) talc as a filler.

The high aspect ratio talc preferably is a powder. The high aspect ratio talc preferably has a lamellarity index of more than 2.8, preferably more than 3.5, more preferably more than 4.0, even more preferably more than 4.5. The lamellarity index characterizes the shape of the particle, and more particularly its flatness (large dimension/thickness). The lamellarity index will be measured by the difference between, on the one hand, the value of the mean dimension of the particles of the powder obtained by a particle size measurement by Malvern laser diffraction using a wet method (standard AFNOR NFX11-666) and on the other hand, the value of the mean diameter D50 obtained by a measurement by sedimentation using a "Sedigraph" (standard AFNOR X11-683), this difference being related to the mean diameter D50 (see also the description thereof in U.S. Pat. No. 6,348,536). As commercially available examples of HAR talc Luzenac HAR® W92 and T84 or can be mentioned. These HAR talcs have a lamellarity index of at least 2.8.

Antioxidant Additives

The present composition comprises from 0.05-2 wt. %, preferably from 0.1-1 wt. % (or from >0.1-1 wt. %) of an antioxidant additive based on the weight of the composition. Said antioxidant additive is selected from the group consisting of i) a tocopherol or a tocotrienol (both being constituents of natural vitamin E); or ii) a hydroxylamine.

According to i) the antioxidant may be a tocopherol or a tocotrienol. As tocopherol a compound according to Formula A below may be used:

Formula A

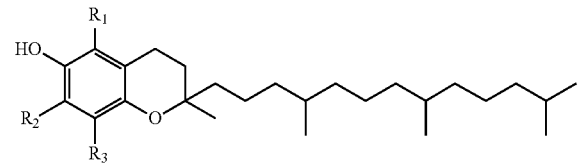

wherein $R^1$, $R^2$, and $R^3$ are each independently either a hydrogen (H) or a methyl ($CH_3$);

including all of its stereoisomer forms for all three chiral centers (RRR, SSS, RRS, RSR, SSR, SRS, SRR, RSS). In an embodiment, the stereoisomer shown below is used.

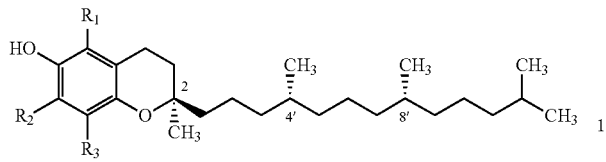

wherein $R^1$, $R^2$, and $R^3$ are each independently either a hydrogen (H) or a methyl ($CH_3$);

As tocotrienol a compound according to Formula B below may be used:

Formula B

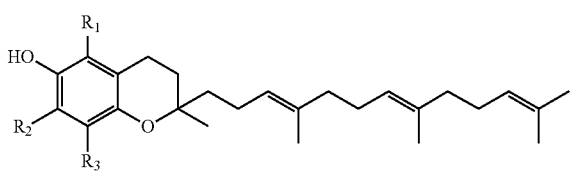

wherein $R^1$, $R^2$, and $R^3$ are each independently either a hydrogen (H) or a methyl ($CH_3$);
including the stereoisomers (RS, RR, SS). In an embodiment, the stereoisomer shown below is used.

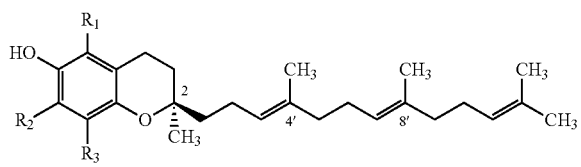

wherein $R^1$, $R^2$, and $R^3$ are each independently either a hydrogen (H) or a methyl ($CH_3$);

As suitable tocopherol compounds may be mentioned the compounds according to Formula A below:

Formula A

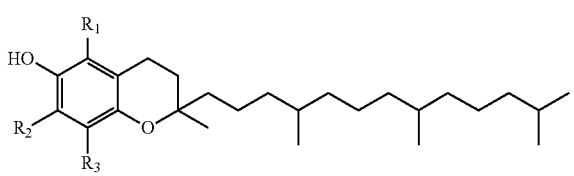

wherein $R^1$, $R^2$, and $R^3$ are each independently either a hydrogen (H) or a methyl ($CH_3$). Examples that are suitable as antioxidants according to the present invention are alpha-tocopherol according to Formula A wherein $R^1$, $R^2$, and $R^3$ are each $CH_3$, beta-tocopherol according to Formula A wherein $R^1$ and $R^3$ are each $CH_3$ and wherein $R^2$ is H, gamma-tocopherol according to Formula A wherein $R^2$ and $R^3$ are each $CH_3$ and $R^1$ is H; and delta-tocopherol according to Formula A wherein $R^1$ and $R^2$ are each H, and $R^3$ is $CH_3$. These structures are shown below:

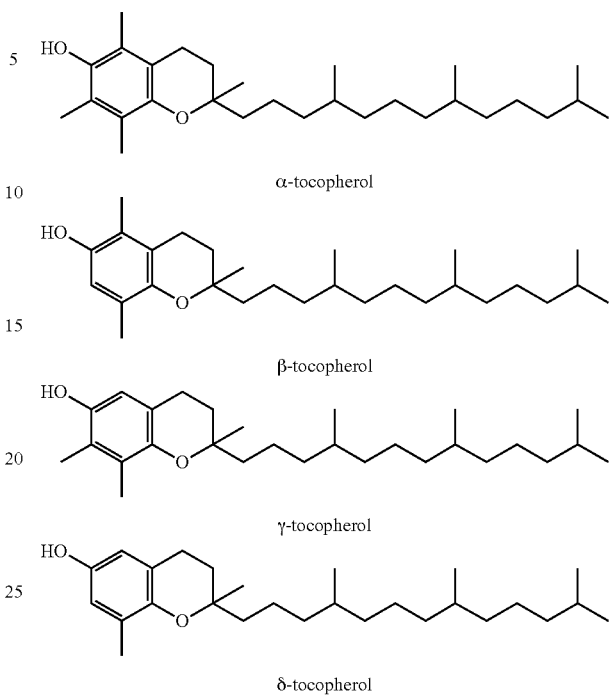

α-tocopherol

β-tocopherol

γ-tocopherol

δ-tocopherol

As suitable tocotrienol compounds may be mentioned the compounds according to Formula B below:

Formula B

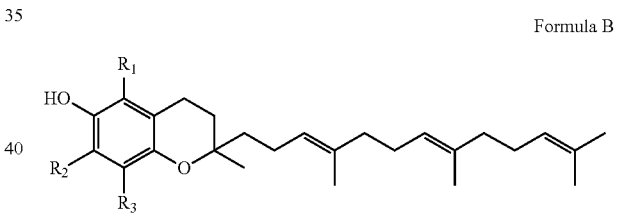

wherein $R^1$, $R^2$, and $R^3$ are each independently either a hydrogen (H) or a methyl ($CH_3$).

Examples that are suitable as antioxidants according to the present invention are alpha-tocotrienol according to Formula B wherein $R^1$, $R^2$, and $R^3$ are each $CH_3$, beta-tocotrienol according to Formula B wherein $R^1$ and $R^3$ are each $CH_3$ and wherein $R^2$ is H, gamma-tocotrienol according to Formula B wherein $R^2$ and $R^3$ are each $CH_3$ and $R^1$ is H; and delta-tocotrienol according to Formula B wherein $R^1$ and $R^2$ are each H, and $R^3$ is $CH_3$. These structures are shown below:

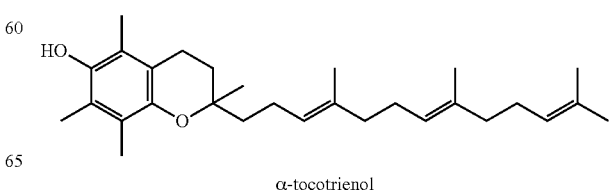

α-tocotrienol

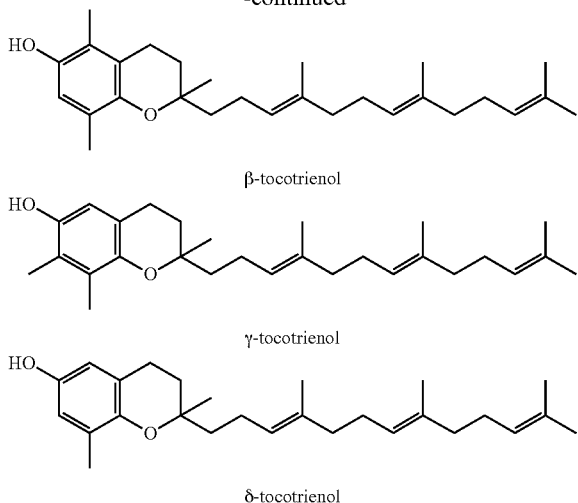

β-tocotrienol

γ-tocotrienol

δ-tocotrienol

A mixture or combination of one or more of these compounds and their stereoisomers may also be used, such as natural vitamin E. In an embodiment, the tocopherol(s) and/or tocotrienol(s) are used in the form of a master batch, viz. a mixture of a polymer and a certain amount of the tocopherol(s) and/or tocotrienol(s), e.g. a master batch comprising between 1 and 10 wt. % of the tocopherol(s) and/or tocotrienol(s) based on the weight of the master batch.

A suitable example of α-tocopherol and/or synthetic α-tocopherol according to the invention may be is Irganox E 201 (supplied by BASF) which is a racemic mixture of equal amounts of all eight possible stereoisomers of α-tocopherol (RRR, SSS, RRS, RSR, SSR, SRS, SRR, RSS) and is referred to as dl-α-tocopherol or all-rac-alpha-tocopherol.

Another example of a suitable antioxidant additive is a hydroxyl amine having the formula C. $R^4(N-OH)R^5$ wherein $R^4$ is a straight or branched chain C1-C36 alkyl, a C5-C12 cycloalkyl, a C7-C9 aralkyl optionally substituted with one or two C1-12 alkyl groups or halogens, and $R^5$ is either hydrogen or independently has the same meaning as $R^4$.

Preferably both $R^4$ and $R^5$ groups are straight saturated alkyl radicals having at least 10, preferably at least 12, more preferably at least 14 carbon atoms or even 16 or 18 carbon atoms. For example a hydroxylamine having two saturated or (mono) unsaturated C14-C22 alkyl groups, such as two saturated C18 groups, which compound is commercially available as Irgastab FS042 or as Everstab FS 042 (bis (octadecyl)hydroxylamine, oxidized bis(hydrogenated tallow alkyl)amines) shown below:

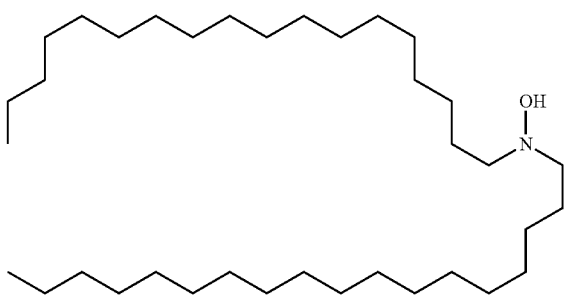 [SMILES: CCCCCCCCCCCCCCCCCCN(O)CCCCCCCCCCCCCCCCCC]

Another example is a quaternary amine precursors for a methyl-alkyl hydroxyl amine, having the following empirical formula $(C_nH_{2n+1})_2$—N(O)—CH$_3$. Other suitable examples are disclosed in U.S. Pat. No. 6,828,764 on column 15, line 40 to column 16, line 14 which section is incorporated by reference.

Additional Additives

Optionally one or more additional additives may be present in the composition according to the present invention. Examples thereof are discussed below.

The composition may contain from 0-3 wt. % of additional additives such a pigments, dyes, mold-release agents, nucleating agents, light (UV) stabilizers, antioxidants, acid scavengers, antistatic agents, lubricants, coupling agent, anti-scratch additives and the like. Obviously the additives may be a mixture of at least two of the foregoing additives. Preferred stabilizers include antioxidants, light (UV) stabilizers, and heat stabilizers. Suitable antioxidants are for example synthetic polyphenolic compounds such as tetrakis [methylene-3-(3',5'-di-t-butyl-4-hydroxyphenyl)propionate] methane; 1,1,3-tris(2-methyl-4-hydroxy-5-t-butylphenyl) butane; 1,3,5-trimethyl-2,4,6-tris(3,5-di-t-butyl-4-hydroxybenzyl)benzene, bis(3,3-bis(4'-hydroxy-3'-t-butylphenyl) butanoic acid]-glycol ester; tris(3,5-di-t-butyl-4-hydroxy benzyl)isocyanurate; 1,3,5-tris(4-t-butyl-2,6-dimethyl-3-hydroxy-benzyl)isocyanurate; 5-di-t-butyl-4-hydroxy-hydrocinnamic acid triester with 1,3,5-tris(2-hydroxyethyl)-s-triazine-2,4,6(1H, 3H, 5H)-trione; p-cresol/dicyclopentadiene butylated reaction product; 2,6-bis(2'-bis-hydroxy-3'-t-butyl-5'-methyl-phenyl-4-methyl-phenol). Suitable additional antioxidants are for example organic phosphites and phosphonites such as triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis (2,4-di-tert-butylphenyl) pentaerythritol diphosphate, bis(2, 6-di-tert-butyl-4-methylphenyl) pentaerythritol diphosphate, bisisodecyloxy-pentaerythritol diphosphite, bis (2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyldibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite.

Examples of light (UV) stabilizers include benzophenone, benzotriazole and triazine type ultraviolet radiation absorbers, hindered hydroxyl-benzoates and hindered amine compounds. Examples of heat stabilizers include distearyl thio diprorionate (DSTDP). The composition may also comprise acid scavengers for example calcium stearate or zinc stearate. Preferred pigments include titanium dioxide, ultramarine blue, iron oxide, carbon black, phthalocyanines, quinacridones, perylenes, nigrosine and anthraquinones. A commercially available example thereof is PLASBLAK PE4884. Preferred nucleating agents include sodium phenylphosphinate, calcium phenylphosphinate, aluminium oxide, silicon dioxide, and talc powder. Preferred antistatic agents are fatty acid esters ethoxylated alkylamines, diethanolamides, ethoxylated alcohols; commercially available examples thereof are Riken DMG-P(V) which is a distilled monoglyceride or Atmer 129 supplied by Croda Plastic Additives, which is a glycerol monostearate. Preferred lubricants and mold-release agents include ester waxes, pentaerythritol tetrastearate (PETS), long-chain fatty acids (preferably stearic acid or behenic acid) and esters or salts thereof (preferably calcium stearate or zinc stearate), and also amide derivatives (preferably ethylene bis stearamide or montan waxes), straight-chain, saturated carboxylic acids having chain lengths of 28-32 carbon atoms, and also low molecular weight polyethylene waxes or low molecular weight polypropylene waxes. Coupling agents are also called adhesion promoters. The adhesion promoter preferably comprises a modified (functionalized) polymer and optionally a low molecular weight compound having reactive polar groups. Preference is further given to modified polymers containing groups deriving from polar compounds, in particular one or more selected from the group consisting of acid anhydrides, carboxylic acids, carboxylic acid derivatives, primary and secondary amines, hydroxyl compounds, oxazoline and epoxides, and also ionic compounds. Specific examples of such polar compounds are unsaturated cyclic anhydrides and their aliphatic diesters, and the diacid derivatives thereof. In particular, one can use maleic anhydride and compounds selected from C1-C10 linear and branched dialkyl maleates, C1-C10 linear and branched dialkyl fumarates, itaconic anhydride, C1-C10 linear and branched itaconic acid dialkyl esters, maleic acid, fumaric acid, itaconic acid and mixtures thereof. A preferred adhesion promoter is a maleic anhydride functionalized polypropylene, such as a propylene polymer grafted with maleic anhydride. A commercially available example for a suitable adhesion promoter is Exxelor® PO1020 obtainable from ExxonMobil Chemical. Suitable examples of anti-scratch additives are erucamide, oleamide and polydimethylsiloxane.

For the avoidance of doubt it is noted that these additives are combined separately with the propylene-based matrix. However, the propylene-based matrix may already contain certain additives, in particular anti-oxidants as is known in the art per se.

Thermoplastic Composition—Parameters

The composition according to the present invention can be manufactured by melt blending the individual components according to any conventional procedure known in the art. Melt mixing devices suited for this process are discontinuous and continuous kneaders, twin screw extruders and single screw extruders with special mixing sections and co-kneaders. With melt-mixing is meant that the components are mixed with the heterophasic propylene copolymer at a temperature that exceeds the melting point of the heterophasic propylene copolymer. Melt-mixing may be done using techniques known to the skilled person, for example in an extruder. Generally, in the process of the invention, melt-mixing is performed at a temperature in the range from 20-260° C. Suitable conditions for melt-mixing, such as temperature, pressure, amount of shear, screw speed and screw design when an extruder is used are known to the skilled person. When using an extruder, a conventional extruder such as a twin-screw extruder may be used. The temperature can vary through the different zones of the extruder as required. For example, the temperature may vary from 180° C. in the feed zone to 260° C. at the die. Preferably, the temperature in the extruder varies from 200 to 260° C.

The composition may be made by compounding the several components. When using HAR talc it is preferred to take certain precautions as the high lamellarity of the particles makes them fragile. A preferable method is to introduce the HAR talc into the polymer melt using a side feeder.

The invention relates to all possible combinations of features described herein, preferred in particular are those combinations of features that are present in the claims. It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps. The range of values "A to B" or "A-B" used herein is understood to mean "at least A and at most B". The invention is now elucidated by way of the following examples, without however being limited thereto.

Measurement Methods

Melt flow index: (MFI) Unless explicitly stated otherwise herein, the melt flow index was measured according to ISO 1133 (2005) (2.16 kg, 230° C.). The unit of MFI is g/10 min. It should be noted that the Melt Flow Index (MFI) and the Melt Flow Rate (MFR) are used interchangeably.

The impact strength was determined by measuring the Izod impact strength determined according to ISO 180-1A (2000) [Test geometry: 65*12.7*3.2 mm, notch 45° according to ISO 37-2 (2011) in perpendicular orientation] at −20° C., 0° C. and 23° C.; P denotes partial breakage, B denotes complete breakage (brittle), T denotes no breakage (tough). The unit of the Izod impact strength is kJ/m².

The flexural modulus was determined according to ISO 178 (2010) at 23° C., the unit is N/mm² or MPa.

Scratch resistance was performed using Erichsen test, K59 texture. The VW scratch resistance test was measured according to the PV 3952 (2002) scratch method of Volkswagen AG company on an Erichsen scratching device, with a load of 10N. The resulting value dL is a measure for the scratch resistance, a low dL value corresponding to high scratch resistance; this means that the scratch does not turn white but keeps the original color of the scratched plaque. To fulfill this test requirement, dL should be lower than 1.5.

Intrinsic viscosity of the propylene polymer ($IV_{PP}$) and of the α-olefin copolymer ($IV_{EPR}$) were determined according to ISO-1628-1 (2009) and ISO-1628-3 (2010) based on the amounts of xylene-soluble matter (CXS) and xylene-insoluble matter (CXI) measured according to ISO 16152 (2005).

Tiger stripes are measured according to the following procedure. After molding, each of the specimens is visually observed for occurrence of tiger stripes on its smooth side and textured side. The quality of the surface is evaluated on a scale of 1 to 10, with 10 being the best, as described in Table below.

| | |
|---|---|
| 1 | very sharp transition between glossy and dull sections visible seen from any angle |
| 2 | sharp transitions between glossy and dull sections seen from any angle |
| 3 | very visible transitions between glossy and dull sections seen from any angle |
| 4 | visible transitions between glossy and dull sections seen from any angle |
| 5 | less visible transitions between glossy and dull sections seen from any angle |
| 6 | visible transitions between glossy and dull sections seen from a specific angle only |
| 7 | less visible transitions between glossy and dull sections seen from a specific angle only |
| 8 | no transitions between glossy and dull sections visible and surface appearance inhomogeneous |

| | |
|---|---|
| 9 | no transitions between glossy and dull sections visible and surface appearance homogeneous |
| 10 | no transitions between glossy and dull sections visible and surface is perfect |

The average tiger stripe rating is defined as the numerical average of the individual tiger stripe ratings for each of the test specimens manufactured at low, medium and high speed, manufactured with the pin-gate and the fan-gate and measured on the smooth and on the textured surface. Hence, the average tiger stripe rating as defined herein is the average of 12 individual tiger stripe measurements.

The tensile modulus as measured according to ISO 527-2(1A) (2012) at 1 mm/min at 23° C. of the composition is preferably at least 1400 MPa. Preferably, the tensile modulus of the composition is at least 1600 MPa, more preferably at least 2000 MPa, even more preferably at least 2400 MPa. The upper limit of the tensile modulus can be as high as 3000 MPa, such as 2800 MPa.

Mold shrinkage, in the context of this invention called shrinkage, is the amount of contraction that a molded part undergoes when it is removed from the mold cavity and cooled at room temperature. Shrinkage was measured according to ISO 294-4 (2001) on 65×65×3.2 mm injection molded plaques after a conditioning time of 24 h after molding at room temperature (23° C.) and 50% relative humidity. Each of the samples was molded using the same conditions at the molding machine. Shrinkage measured in the flow length and perpendicular to the flow is reported here. The following equation was used to determine shrinkage:

$$\frac{L_m - L_s}{L_m} \times 100 = \text{shrinkage}[\%]$$

wherein $L_m$ is the length of the mold in the considered direction, and $L_s$ is the length of the specimen in considered direction. A shrinkage in the flow direction, a shrinkage in the perpendicular direction to flow direction, as well as an average (arithmetic) of both shrinkage values is reported. The unit of the average shrinkage is percentage (%). The shrinkage is also measured after annealing, viz. after heating to a temperature of 90° C. for 1 hour. The unit of the average shrinkage after annealing is percentage (%).

Warpage is determined by the same measurement method as shrinkage; it is a ratio. The warpage is also measured after annealing, viz. after heating to a temperature of 90° C. for 1 hour.

Automotive part The automotive part, e.g. the bumper fascia, cowl top, instrument panel, pillar trim or door panel according to the invention can be a semi-finished or finished article made from the propylene-based matrix by a molding process, such as injection molding or blow molding. In an embodiment the composition may be shaped by means of extrusion so that the container, at least in part, is made by means of extrusion.

Method

In a further aspect the present invention relates to a method for the manufacture of an automotive part as described herein comprising thermoforming or injection molding the composition as defined herein. In yet a further aspect the present invention relates to a composition as defined herein, preferably for the use for the manufacture of an automotive part.

Preferred embodiments of this invention are described herein. Variation of those preferred embodiments may become apparent to those of ordinary skill in the art upon reading the foregoing description.

For the purpose of clarity and a concise description features are described herein as part of the same or separate embodiments. However, it will be appreciated that the scope of the invention may include embodiments having combinations of all or some of the features described. The invention will now be further illustrated by the following non-limiting examples.

EXAMPLES

In the experiments the following non-limiting materials were used. All of the heterophasic copolymers are reactor grade materials, i.e. are non-shifted or non-visbroken grades. All of the components are melt-mixed together to form a molding composition.

As available examples of suitable heterophasic propylene copolymers, the following may be mentioned.

PP01: this is a heterophasic propylene copolymer commercially available from SABIC having a MFI of 70 g/10 min, a C2/C3 rubber content (RC) of about 18 wt. % and a C2 content of the rubber phase (RCC2) of about 54 wt. %.

PP02: this is a heterophasic propylene copolymer commercially available from SABIC having a MFI of 33 g/10 min, a C2/C3 rubber content (RC) of about 18 wt. % and a C2 content of the rubber phase (RCC2) of about 54 wt. %.

PP03: this is a heterophasic propylene copolymer according to the second embodiment disclosed above having a rubber content (C2/C3 copolymer) of 20 wt. %, a MFI of 40 g/10 min and a C2 content of the rubber phase (RCC2) of 55 wt. %.

PP04: this is a heterophasic propylene copolymer according to the third embodiment disclosed above having a rubber content (C2/C3 copolymer) of 30 wt. %, and having a C2 content of the rubber phase (RCC2) of 50 wt. % and MFI of 14 g/10 min.

PP05: this is a heterophasic propylene copolymer according to the first embodiment above having a rubber content (C2/C3 copolymer) of 14 wt. %, and having a C2 content of the rubber phase (RCC2) of 6.5 wt. % and MFI of 77 g/10 min.

PP06: this is a heterophasic propylene copolymer commercially available from SABIC having a MFI of 33 g/10 min, a C2/C3 rubber content (RC) of about 18 wt. % and a C2 content of the rubber phase (RCC2) of about 54 wt. %.

PP07: this is a homopropylene with an MFI of 44 g/10 min.

The following components are used in the examples. Talc is a HAR talc having a lamellarity of 4.8. Phenolic antioxidant: pentaerythritol tetrakis(3-(3,5-di-tert-butyl-4-hydroxyphenyl)propionate. As antistatic agent a glycol ester is used. As an antioxidant additive 1 bis(octadecyl)hydroxylamine is used. As an antioxidant additive 2 a master batch comprising 3 wt. % of alpha-tocopherol in a polymer is used. As an additional antioxidant: tris(2,4-di-tert-butylphenyl)phosphite. CMB is color master batch. As the ethylene α-olefin elastomer is used: an ethylene based elastomer having a density of 0.861 g/cm³ and a MFI of 0.9 g/10 min (ASTM D1238, 2.16 kg, 190° C.).

TABLE 1

|  | Molding composition (wt. %) | | |
|---|---|---|---|
|  | CE1 | E1 | E2 |
| PP01 | 62.6 | 62.6 | 62.1 |
| Elastomer | 14 | 14 | 14 |
| Talc | 22 | 22 | 22 |
| Antioxidant additive 1 | 0.0 | 0.1 | 0.0 |
| Antioxidant additive 2 | 0.0 | 0.0 | 0.7 |
| Phenolic antioxidant | 0.1 | 0.0 | 0.0 |
| additional antioxidant | 0.1 | 0.1 | 0.0 |
| Antistatic agent | 0.2 | 0.2 | 0.2 |
| CMB | 1 | 1 | 1 |
| Total | 100 | 100 | 100 |

As clearly seen from Table 1 above there is no antioxidant additive in the comparative example; Examples 2 and 3 disclose two different types of antioxidant additives. These two compositions have been tested for several features, such as MFI, Izod impact strength, flexural modulus, average shrinkage, warpage, VOC, TVOC and FOG; the data are shown below in Table 2.

TABLE 2

| Features | CE1 | E1 | E2 |
|---|---|---|---|
| MFI | 17.6 | 19.4 | 17.2 |
| Izod strength at 23° C. | 25.4 B | 29.6 B | 27.8 B |
| Izod strength at 0° C. | 11.1 B | 13.3 B | 16.4 B |
| Flexural modulus | 2436 | 2426 | 2333 |
| Average shrinkage | 0.59 | 0.61 | 0.66 |
| Average shrinkage after annealing | 0.64 | 0.67 | 0.71 |
| Warpage | 1.18 | 1.14 | 1.06 |
| Warpage after annealing | 1.21 | 1.19 | 1.14 |
| VOC value | 97.9 | 83.1 | n.d. |
| Fog value | 387 | 429 | n.d. |
| TVOC granules | 8 | 8 | 19 |
| TVOC plaques | 207 | 15 | 43 | n.d. = not determined

From the above date is can be seen that the VOC and TVOC values are decreased and hence the emission has decreased. Hence one or more of the objects of the invention are accomplished by the invention as defined in the appending claims. In addition, other relevant parameters do not significantly change therefore, the present invention does not jeopardize the performance of the reinforced articles prepared from the composition.

The invention claimed is:

1. An automotive part prepared from a thermoplastic composition comprising
from 62-95 wt. % based on the weight of the thermoplastic composition of a heterophasic propylene copolymer;
from 0-20 wt. % based on the weight of the thermoplastic composition of an ethylene-α-olefin elastomer comprising ethylene and a C3 to C10 α-olefin;
from 1-30 wt. % based on the weight of the thermoplastic composition of high aspect ratio (HAR) talc having a lamellarity of at least 2.8 as a filler;
from 0.05-2 wt. % based on the weight of the thermoplastic composition of an antioxidant additive selected from the group consisting of i) a tocopherol according to Formula A below:

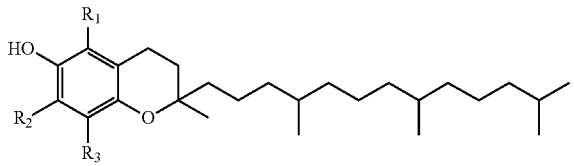

Formula A wherein $R^1$, $R^2$, and $R^3$ are each independently either a hydrogen (H) or a methyl ($CH_3$);
a tocotrienol according to Formula B below:

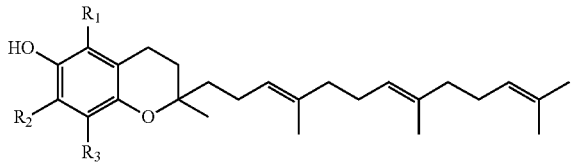

Formula B wherein $R^1$, $R^2$, and $R^3$ are each independently either a hydrogen (H) or a methyl ($CH_3$); and
ii) a hydroxylamine according to formula C below:

$R^4(N\text{—}OH)R^5$   Formula C wherein $R^4$ is a straight or branched chain C1-C36 alkyl, a C5-C12 cycloalkyl, a C7-C9 aralkyl optionally substituted with one or two C1-12 alkyl groups or halogens, and $R^5$ is either hydrogen or independently has the same meaning as $R^4$; and
from 0-3 wt. % based on the weight of the thermoplastic composition of an additional additive;
wherein said thermoplastic composition is free of phenolic antioxidant additives other than the tocopherol of Formula A and the tocotrienol of Formula B;
wherein the thermoplastic composition has an emission of volatile organic compounds (VOCs) as measured according to the standard procedure VDA 278 (2011) of at most 250 microgram/gram; and
an emission of total carbon emission (TVOCs) as measured according to the standard procedure VDA 277 (1995) of at most 50 micrograms of carbon/gram on injection molded plaques.

2. The automotive part according to claim 1, wherein the heterophasic propylene copolymer comprises:
from 70 to 92 wt. % based on the weight of said heterophasic propylene copolymer of a propylene-based matrix consisting of a polypropylene having a melt flow index of at least 150 g/10 min as determined by ISO1133 (2005) at 230° C. and 2.16 kg;
from 8 to 30 wt. % based on the weight of said heterophasic propylene copolymer of a dispersed ethylene-α-olefin copolymer having an ethylene content of between 10 and 55 wt. % based on the weight of the ethylene-α-olefin copolymer.

3. The automotive part according to claim 1, wherein the heterophasic propylene copolymer comprises:
from 70 to 90 wt. % based on the weight of the heterophasic propylene copolymer of a polypropylene-based matrix consisting of a polypropylene having a melt flow index of from 55 to 85 g/10 min as measured according to ISO 1133 (2005) at 230° C. and 2.16 kg; and from 10 to 45 wt. % based on the weight of the heterophasic propylene copolymer of a dispersed-ethylene-α-olefin copolymer having a melt flow index of from 2.5 to 5.0 g/10 min as measured according to ISO 1133 (2005) at 230° C. and 2.16 kg;

wherein the sum of the polypropylene-based matrix and the dispersed ethylene-α-olefin copolymer is 100 wt. %.

4. The automotive part according to claim 1, wherein the heterophasic propylene copolymer comprises:

from 60 to 85 wt. % based on the weight of the heterophasic propylene copolymer of a polypropylene-based matrix consisting of a polypropylene having a melt flow index of from 50 to 100 g/10 min as measured according to ISO 1133 (2005) at 230° C. and 2.16 kg; and from 15 to 40 wt. % based on the weight of the heterophasic propylene copolymer of a dispersed ethylene-α-olefin copolymer having a melt flow index of from 0.050 to 0.30 g/10 min as measured according to ISO 1133 (2005) at 230° C. and 2.16 kg, wherein the sum of the polypropylene-based matrix and the dispersed ethylene-α-olefin copolymer is 100 wt. %.

5. The automotive part according to claim 1, wherein the high aspect ratio (HAR) talc has a lamellarity of at least 3.5.

6. The automotive part according to claim 1, wherein the thermoplastic composition has a melt flow index between 5 and 70 g/10 min as determined in accordance with ISO 1133 (2005) at 230° C. and 2.16 kg.

7. The automotive part according to claim 1, wherein the thermoplastic composition has a tensile modulus as measured in accordance with ISO 527-2 (1A) (2012) at 23° C. of at least 1400 MPa.

8. The automotive part according to claim 1, wherein the automotive part is an exterior automotive part and wherein the thermoplastic composition has an Izod impact strength determined according to ISO 180 1A (2000) of at least 1.5 kJ/m² at −20° C. and/or at least 35 KJ/m² 23° C. (tough failure) or wherein the automotive part is a semi-exterior automotive part and wherein the thermoplastic composition has an Izod impact strength determined according to ISO 180 1A (2000) of at least 1.5 kJ/m² at 0° C. and/or at least 10 kJ/m² at 23° C. or wherein the automotive part is an interior automotive part and wherein the thermoplastic composition has an Izod impact strength determined according to ISO 180 1A (2000) of at least 1.5 kJ/m² at 0° C. and/or at least 10 kJ/m² at 23° C.

9. The automotive part according to claim 1, wherein the thermoplastic composition has a flexural modulus measured according to ISO 178 (2010) at 23° C. of at least 1300 MPa.

10. The automotive part according to claim 1, wherein the thermoplastic composition has an emission of volatile organic compounds (VOCs) as measured according to the standard procedure VDA 278 (2011) of at most 150 microgram/gram.

11. The automotive part according to claim 1, wherein a light stabilizer is present as additional additive.

12. The automotive part according to claim 1, wherein said thermoplastic composition comprises from 1-20 wt. % based on the weight of the thermoplastic composition of the ethylene-α-olefin elastomer.

13. The automotive part according to claim 1, wherein said thermoplastic composition comprises from more than 5 up to 30 wt. % based on the weight of the thermoplastic composition of the high aspect ratio (HAR) talc.

14. The automotive part according to claim 1,
wherein said thermoplastic composition comprises from 1-20 wt. % based on the weight of the thermoplastic composition of the ethylene-α-olefin elastomer;
wherein said thermoplastic composition comprises from more than 5 up to 30 wt. % based on the weight of the thermoplastic composition of the high aspect ratio (HAR) talc.

15. The automotive part according to claim 1, wherein the thermoplastic composition comprises >0.1-1 wt. % of the antioxidant additive.

16. The automotive part according to claim 1, wherein
the lamellarity of the high aspect ratio (HAR) talc is more than 4.5; and
the antioxidant additive comprises the tocopherol according to Formula A or the hydroxylamine according to formula C.

17. The automotive part according to claim 1, wherein the thermoplastic composition comprises from 0.1-2 wt. % based on the weight of the thermoplastic composition of the antioxidant additive.

18. The automotive part according to claim 1, wherein the antioxidant additive comprises the tocopherol according to Formula A.

19. A method for the manufacture of the automotive part according to claim 1 comprising injection molding the thermoplastic composition.

* * * * *